(12) United States Patent
Ramaswamy et al.

(10) Patent No.: US 10,120,721 B2
(45) Date of Patent: Nov. 6, 2018

(54) PLUGGABLE ENGINE FOR APPLICATION SPECIFIC SCHEDULE CONTROL

(71) Applicant: VMware, Inc., Palo Alto, CA (US)

(72) Inventors: Naveen Ramaswamy, Pune (IN); Dimal Baby, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/926,478

(22) Filed: Oct. 29, 2015

(65) Prior Publication Data
US 2017/0060641 A1 Mar. 2, 2017

(30) Foreign Application Priority Data
Aug. 28, 2015 (IN) .......................... 4531/CHE/2015

(51) Int. Cl.
*G06F 9/46* (2006.01)
*G06F 9/50* (2006.01)

(52) U.S. Cl.
CPC .................................. *G06F 9/5038* (2013.01)

(58) Field of Classification Search
CPC .................................................... G06F 9/5038
See application file for complete search history.

(56) References Cited

U.S. PATENT DOCUMENTS

| | | | | |
|---|---|---|---|---|
| 6,304,906 B1* | 10/2001 | Bhatti | ................. | H04L 12/2856 370/395.43 |
| 7,363,626 B2* | 4/2008 | Koutharapu | ............ | G06F 9/505 709/223 |
| 7,454,752 B2* | 11/2008 | Masuoka | ................ | G06F 9/542 714/2 |
| 8,347,295 B1* | 1/2013 | Robertson | .............. | G06Q 10/06 718/103 |
| 8,583,467 B1* | 11/2013 | Morris | .................... | G06Q 10/06 705/7.22 |
| 2004/0031035 A1* | 2/2004 | Shiu | ..................... | G06F 21/6209 718/102 |
| 2010/0235840 A1* | 9/2010 | Angaluri, Sr. | .......... | G06F 1/329 718/102 |
| 2014/0331233 A1* | 11/2014 | Matskevich | ............ | G06F 9/505 718/103 |
| 2015/0135183 A1* | 5/2015 | Kipp | ......................... | G06F 9/46 718/103 |

* cited by examiner

*Primary Examiner* — Camquy Truong

(57) ABSTRACT

A method of scheduling tasks for a group of applications. Each application is associated with a separate task queue for identifying application tasks that are ready for execution. The method receives a request to place a task in an application task queue. The method places the task in the application task queue based on a set of intra application scheduling policies defined for the application. The method receives a request to identify the next task to execute. The method identifies an application queue from which from which the next task is to be executed. The application queue is identified based on a set of inter application scheduling policies defined for the plurality of applications. The method schedules a task from the identified application queue for execution based on the intra application scheduling policies.

21 Claims, 12 Drawing Sheets

PLUGGABLE ENGINE FOR APPLICATION SPECIFIC SCHEDULE CONTROL

BACKGROUND

Scheduling is the method by which threads, processes, or data flows are given access to system resources such as processor time, communications bandwidth, etc. The intent of a scheduler is to perform multitasking and multiplexing of the jobs. The same requirement holds true for scheduling jobs running within an enterprise web application. The applications that consume system resources such as processor time and memory can be managed by a scheduler in different ways based on the type of workloads. A central problem in designing a multi-threaded enterprise application is to find out the appropriate scheduling algorithm that decides which task needs to be executed next in a heavily loaded environment. One approach is to create a thread pool per application and schedule the workloads only through the available threads. The thread pool allocation for different applications should be based on the total capacity the system can withstand. This approach achieves the fair sharing of threads across the application. But is highly inefficient in terms of utilization of system threads.

Another approach is to keep a single thread pool for the whole system and different applications use the same pool to schedule their workloads. This approach allocates system resources based on a first-come first-served basis. Whenever a new thread is released to the pool, the scheduler picks up a job from its waiting list and allocates the thread to it to complete the job. This approach is more efficient in terms of resource utilization, but fails to achieve fair share between applications because it can so happen that continuous creation of jobs from an application can result in resource starvation for other applications.

BRIEF SUMMARY

Some embodiments provide a pluggable scheduler architecture that is integrated in an existing scheduler or operates as a standalone scheduler. The pluggable architecture is capable of scheduling the workloads efficiently and fairly across different applications. Inter-application level and intra-application level of scheduling optimization are provided.

In inter application level, fairness is specified across applications. A fairness algorithm evaluates the next application to be scheduled based on strategies such as weight-based, priority-based, round robin, etc., among all the applications in the system.

In intra application level, there can be multiple types of workload from an application. The order in which the execution occurs is decided by the scheduler based on the scheduling strategy defined by the application consumer.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Pluggable Schedule Controller for Providing Customized Scheduling Policies

Some embodiments provide a pluggable scheduler that is capable of scheduling workloads efficiently and fairly across different applications. Fairness is referred to allocating processor time to each job (or process) either equally or according to priority and workload of each job. A Job is a set of tasks that are related. A task is a unit of work that can be executed on a single machine. A job in some embodiments can be either scheduled or is executed asynchronously at any point. Each application can have one or more jobs to execute.

Some embodiments maintain a thread pool to execute, schedule, and keep track of jobs that can be invoked by different components. A thread of execution in some embodiments is the smallest sequence of programmed instructions that can be managed independently by a scheduler. Multiple threads can exist within the same job, executing concurrently by starting a thread before another thread finishes. The threads of a job share the job's executable code and the job's context (i.e., the values of the job's variables at a given point of time). On a single processor, multiple threads are implemented by time slicing. The processor then switches between different threads. On a system with multiple processors, multiple threads can be executed in parallel with each processor executing a separate thread simultaneously.

Creating and destroying each thread requires an overhead. In addition, each thread consumes system resources (e.g., memory or disk space). Creating too many threads, therefore, causes execution overhead as well as exhaustion of system resources. Using a thread pool allows reusing a thread for different tasks. In addition, the number of threads can be selected to prevent exhaustion of the system resources.

Figure 1:
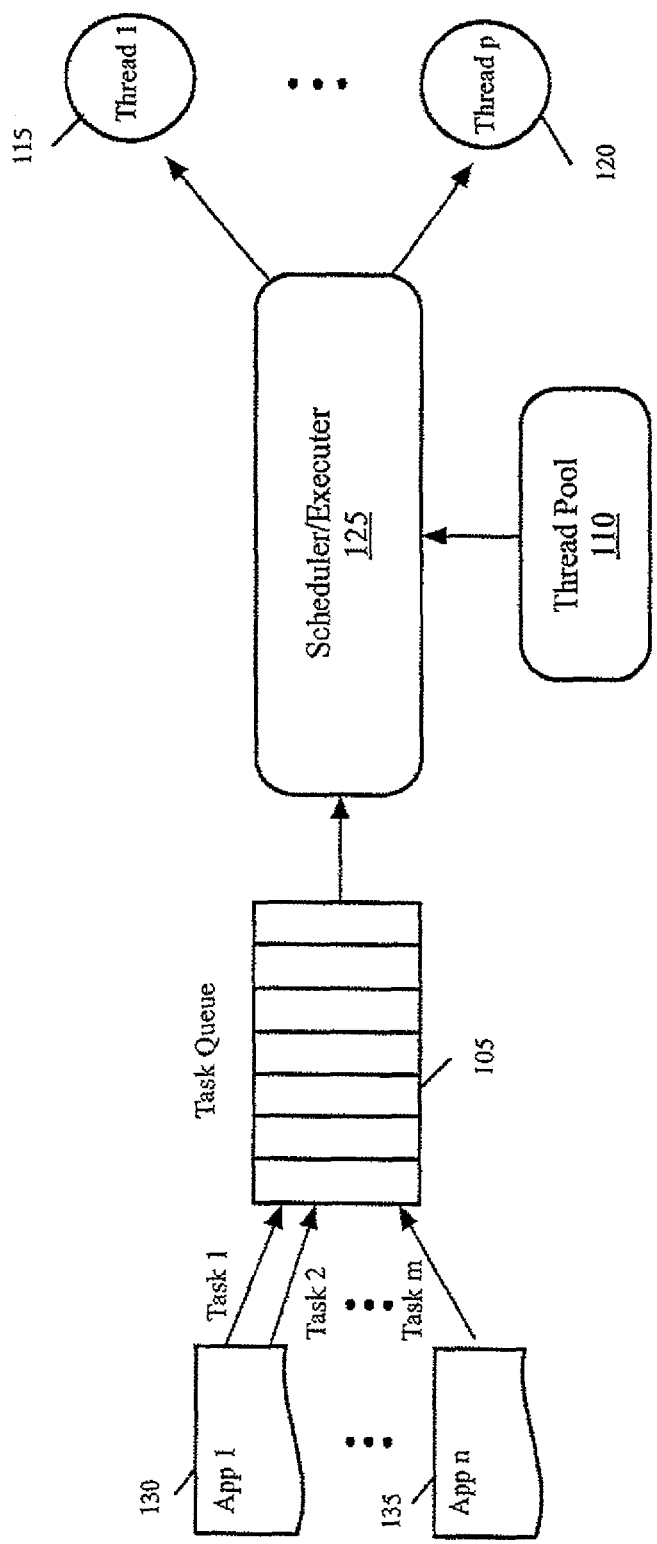
FIG. 1 conceptually illustrates a scheduler that utilizes a single thread pool in some embodiments.

FIG. 1 conceptually illustrates a scheduler that utilizes a single thread pool in some embodiments. As shown, a task queue 105 is utilized to receive tasks that are ready for execution. The tasks may be added by the same or different applications. In the example of FIG. 1, application 130 has added two tasks and application 135 has added one task to the task queue 105.

The scheduler (or executer) 125 maintains a single thread pool 110. For instance, when the maximum number of allowed threads is 20, the scheduler maintains up to 20 threads in the thread pool 110. As tasks that are ready for execution are added to the task queue 105 by different applications 130-135, the scheduler 125 checks the number of available threads in the thread pool. If there is any available thread left in the thread pool, the scheduler assigns the next task in the queue to the next available thread. For instance, if the task queue 105 is maintained as a first come first served, FCFS, queue (also known as first in first out, FIFO, queue) the earliest task added to the queue is assigned to the next available thread. This process continues until either there are no more tasks ready for execution or all available threads are used. Once all available threads are used, the tasks that are ready for execution remain in the task queue until one or more threads become available. As described further below, some embodiments provide a pluggable schedule controller that is integrated in an existing scheduler such as the scheduler described by reference to FIG. 1 or operates as a standalone scheduler.

Figure 2:
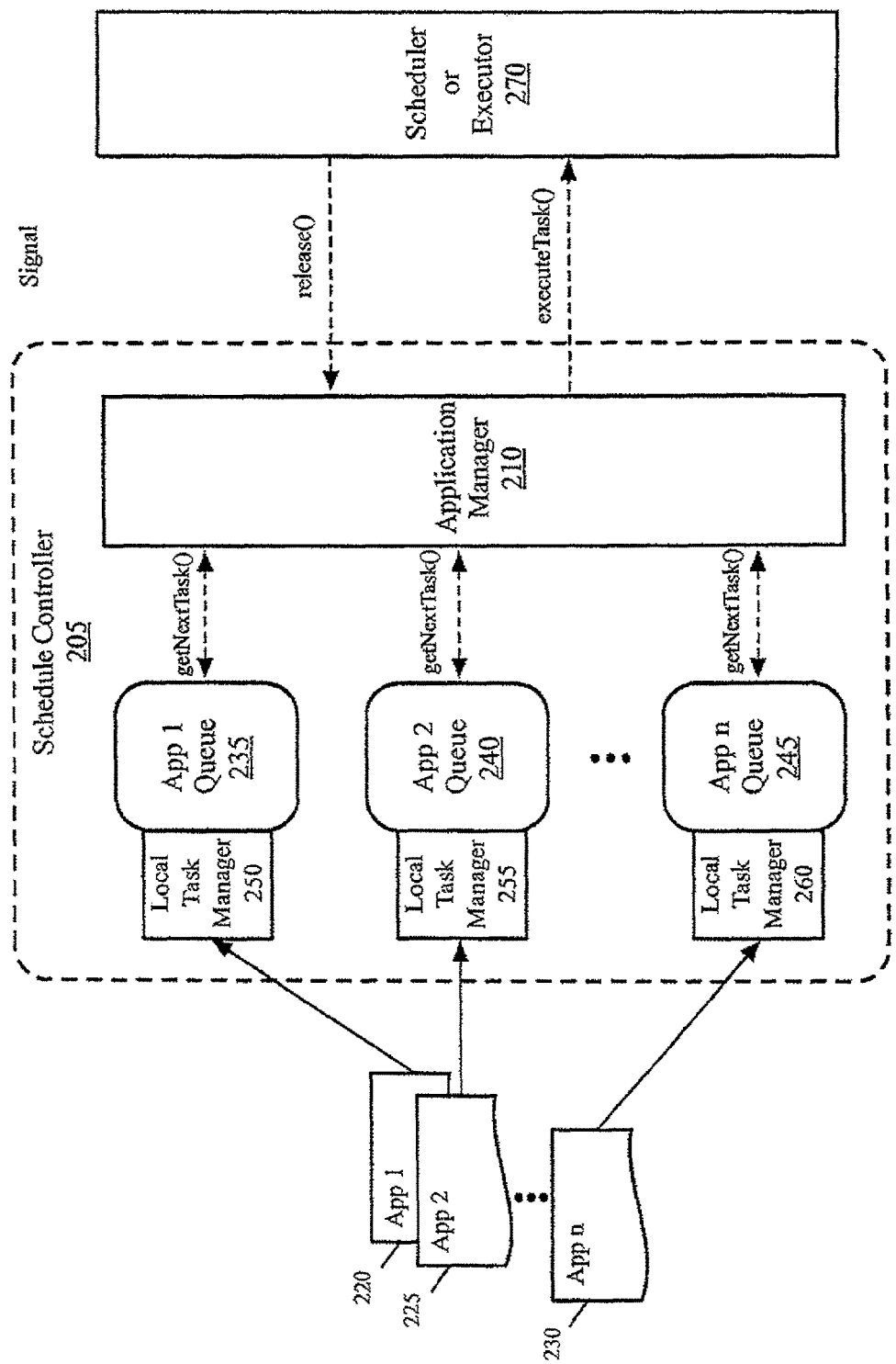
FIG. 2 conceptually illustrates the architecture of a schedule controller (or schedule control engine) in some embodiments.

FIG. 2 conceptually illustrates the architecture of a schedule controller (or schedule control engine) in some embodiments. The architect of the schedule controller in some embodiments is extendable to integrate with other schedulers such as scheduler 125 in FIG. 1. In other embodiments, the architecture represents a scheduler that operates as a standalone scheduler. As shown, the schedule control engine 205 includes an application (or module) manager 210, and a set of local task managers (LTMs) 250-265 for the management and the control of tasks from different applications.

The schedule controller 205 provides a set of application programming interfaces (APIs) that are utilized by different applications (such as applications App 1-App n 220-230) to add tasks and specify scheduling and control strategies. Each application 220-230 maintains a separate queue 235-245 for each application 120-130 at run time.

Each queue is utilized by the corresponding application for the tasks that are waiting to be executed. The schedule controller manages the runtime creating and destroying of the queues 235-245. The applications utilize the APIs provided by the schedule controller to add tasks to their corresponding queues.

As shown, a local task manager 250-260 is associated with each application queue 235-245 to define the execution order of tasks within an application. In some embodiments, the scheduling strategy (i.e., the execution order) of each application is defined by the consumer (e.g., through a programmatic interface). The default scheduling strategy performed by each LTM is overridden by a custom defined strategy that determines the execution strategy of tasks within the corresponding application.

A. Providing Customized Intra Application Scheduling Policies

Figure 3:
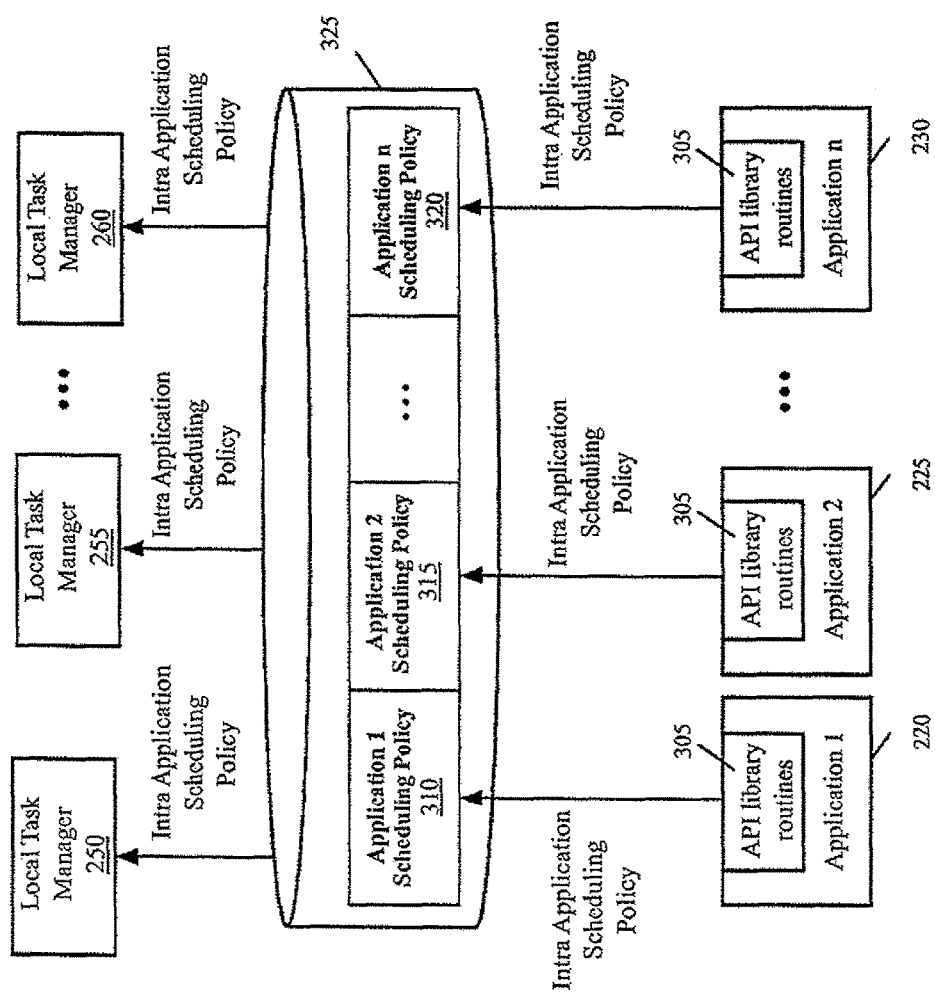
FIG. 3 conceptually illustrates entering or modifying scheduling policies of individual applications using APIs in some embodiments.

FIG. 3 conceptually illustrates entering or modifying scheduling policies of individual applications using APIs in some embodiments. As shown, each application 220-230 uses a set of library routines 305 to define intra application scheduling policies for the application. The library routines 305 use an API to define the intra application scheduling policies.

Different scheduling policies include first come first served scheduling, shortest job first scheduling, priority scheduling, round robin scheduling, and weight-based scheduling. First come first served policy executes tasks based on the time the tasks are placed in the queue. Shortest job first policy schedules the shortest task in the queue first for execution. The policy minimizes the waiting time of the tasks, however there is a need to know the execution time of each task in advance, which is impractical in most applications. Priority (or priority based) scheduling assigns a priority to each task. The task with the highest priority is executed first.

Round robin scheduling provides each task with a fixed time to execute. Weight-based scheduling is used, for example, in network schedulers. Each data flow is assigned a weight and packets in each data flow are scheduled based on the weight assigned to the corresponding data flow.

As shown, the scheduling policies 310-320 for each application is stored in a database 325. During the execution of each application 220-230, the corresponding local task manager 250-260 uses the application's intra application scheduling policy 310-320 to determine which task is removed from the corresponding application's queue 235-245 (shown in FIG. 2). In the absence of a custom defined scheduling strategy, each LTM uses a default scheduling policy such as first come first served.

Accordingly, each queue 235-245 maintains the execution order of the tasks from the corresponding application 220-230. The execution order of the tasks in some embodiments is dynamically changed by the corresponding local task manager 250-260 based on the strategies defined for each application.

Referring back to FIG. 2, application manager 210 manages the fair share of resources across the applications. The Application manager provides an API to specify a custom strategy to define scheduling across applications. In some embodiments, the scheduling (i.e., the execution) strategy across all applications is defined by the consumer (e.g., through a programmatic interface). The current execution strategy performed by the application manager 210 is overridden by a custom defined strategy that determines the execution strategy of tasks across the applications.

B. Providing Customized Inter Application Scheduling Policies

Figure 4:
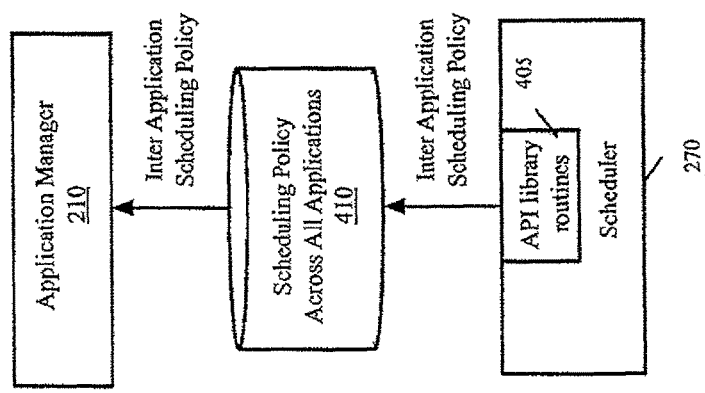
FIG. 4 conceptually illustrates entering or modifying inter application scheduling policies using APIs in some embodiments.

FIG. 4 conceptually illustrates entering or modifying inter application scheduling policies using APIs in some embodiments. As shown, the scheduler 270 uses a set of library routines 405 to define inter application scheduling policies.

The library routines 405 use an API to define the inter application scheduling policies.

Although the scheduler is shown as the program that uses the API library routines 405 to define the inter application scheduling policies, it should be understood that other programs can use the programmatic interface provided by the API library routines 405 to define inter application scheduling policies.

Different scheduling policies include first come first served scheduling, shortest job first scheduling, priority scheduling, round robin scheduling, and weight-based scheduling. As shown, the scheduling policy is stored in a storage location 410. During the execution, the application manager 210 uses the inter application scheduling policy 410 to determine the queue 235-245 (shown in FIG. 2) from which the next task is removed. In the absence of a custom defined scheduling strategy, the application manager uses a default strategy such as first come first served to select the next task to be executed from a queue.

The schedule controller in some embodiments provides an API for the consumers (e.g., the application 220-230). Whenever an application requires a task to be executed, the application utilizes this API to add tasks (through the corresponding LTM) to the application's queue. The schedule controller creates a new queue for an application only when there are no tasks waiting from the same application. Otherwise, the new task is added to the application's existing queue.

C. Scheduler Workflows

Figure 5:
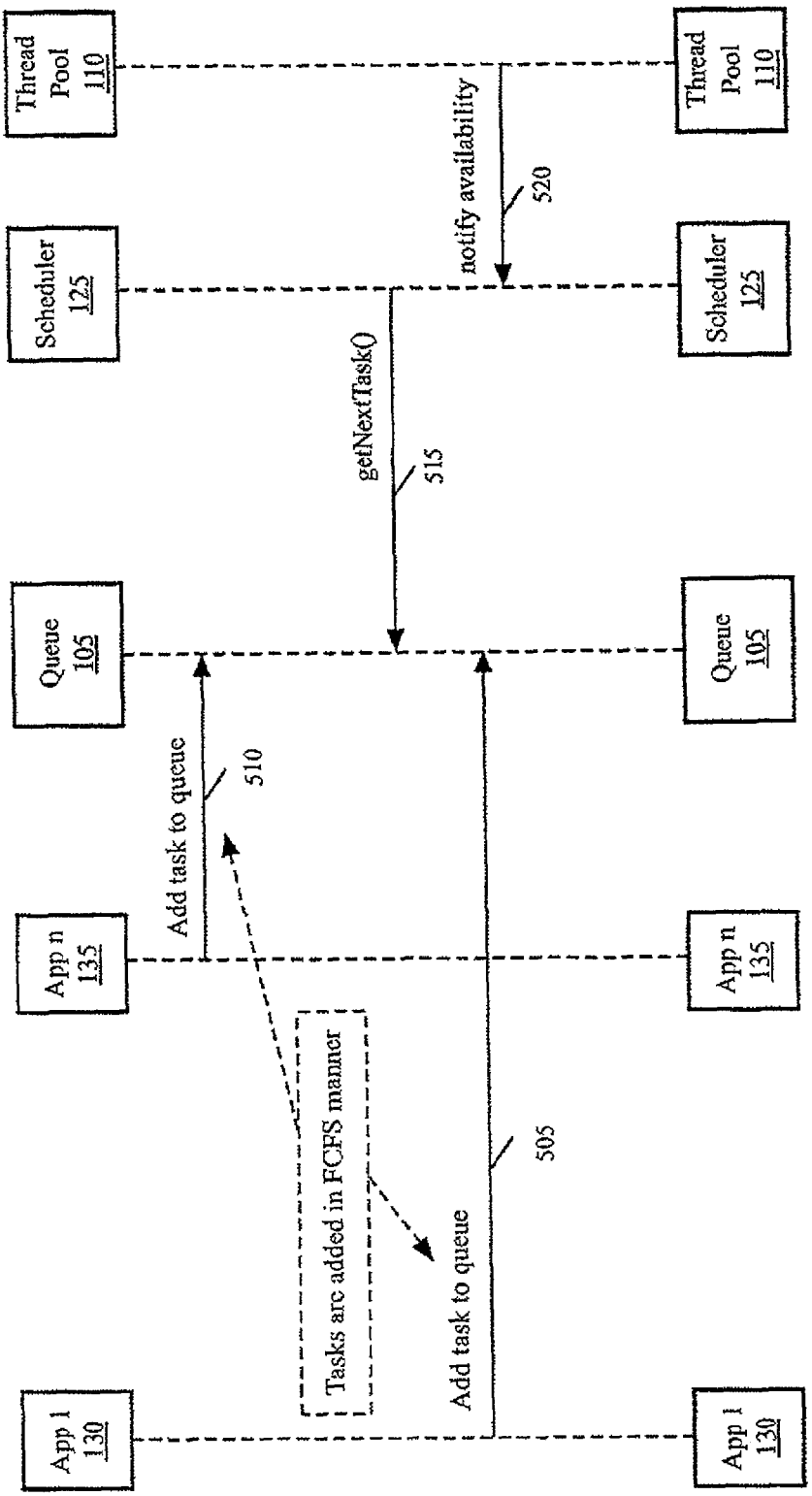
FIG. 5 conceptually illustrates the workflow for the scheduler of FIG. 1.

FIG. 5 conceptually illustrates the workflow for the scheduler 125 of FIG. 1. As described above, the scheduler of FIG. 1 maintains only one queue 105 (as opposed to the schedule controller of FIG. 2 that maintains one queue 30235-245 per application 220-230). As shown in FIG. 5, each application 130-135 utilizes an API (as shown by arrows 505-510) to add tasks that are available for execution to the queue 105. As shown, only one queue 105 is maintained by the scheduler 125 and the tasks are added to the queue as FCFS.

The scheduler maintains a thread pool 110. The thread pool maintains a predefined or a selectable maximum number of threads. As long as a thread is available, the scheduler 125 requests the queue 105 (as shown by arrow 515) to identify the next task for execution. The next task from the queue 105 is then sent for execution. The thread is executed by the processor (or one of the processors if there are multiple processors). Once a thread executes to completion, the thread is released back to the thread pool and the scheduler is notified (as shown by arrow 520) that a thread has become available.

Once all available threads are in use, the scheduler leaves the remaining tasks in the queue 105 until a thread becomes available. At that time, the thread pool notifies the availability (as shown by arrow 520) to the scheduler. The scheduler in turn requests the queue to identify the next task for execution, as described above.

Figure 6:
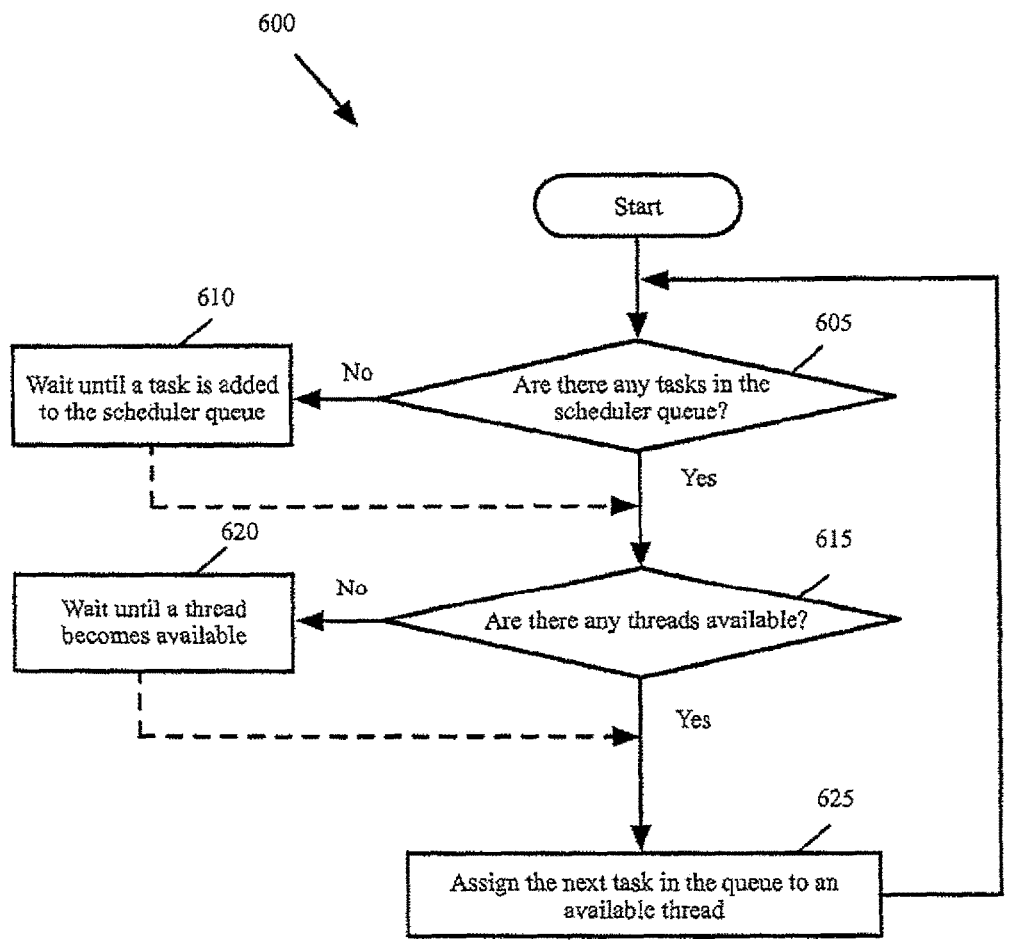
FIG. 6 conceptually illustrates a process for scheduling tasks by the scheduler shown in FIG. 1.

FIG. 6 conceptually illustrates a process 600 for scheduling tasks by the scheduler 125 shown in FIG. 1. As shown, the process determines (at 605) whether there are any tasks in the scheduler queue. If not, the process waits (at 610) for a task to be added to the scheduler queue. For instance, the process in some embodiments hibernates and wakes up when a task is added to the queue 105 (shown in FIG. 1).

When there are tasks in the queue for execution, the process determines (at 615) whether there are any available threads in the thread pool 110 (shown in FIG. 1). If not, the process waits (at 620) until a thread becomes available. For instance, the process in some embodiments hibernates until the thread pool notifies (e.g., as shown by arrow 520 in FIG. 5) that a thread is available.

When there is an available thread, the process assigns (at 625) the next task in the queue to an available thread. For instance, the process requests the queue 105 to get the next task (as shown by arrow 515 in FIG. 5), which results the queue to release the next task for execution (as shown by arrow 525 in FIG. 5). The process then proceeds to 605, which was described above.

Referring back to FIG. 2, two additional APIs are provided by the schedule controller 205 for the Scheduler/Executor 270 consumption. The two APIs are release( ) and executeTask( ) The release( ) API is used to signal a notification from the scheduler 270 to application manager 210 indicating that a thread has been released to pool. Application manager 210 listens for this notification. Once application manager uses the inter application scheduling policies to identify the next queue 235-245 from which to execute a task. The application manager uses getNextTask( ) API to get the task at the top of the identified queue using getNextTask( ) API. The application manager then use the executeTask( ) API on the scheduler 270 and passes the next task to be executed to the scheduler.

Figure 7:
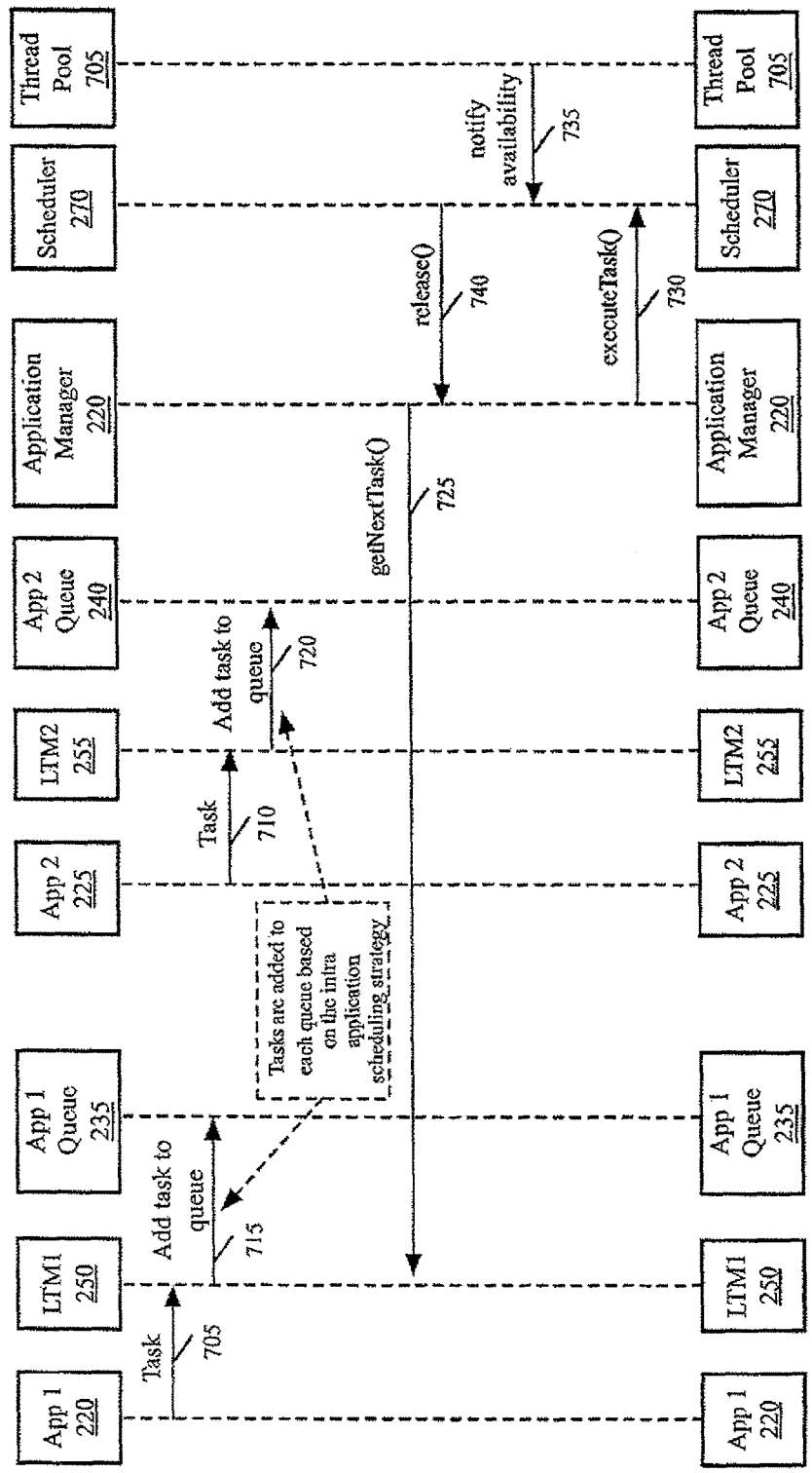
FIG. 7 conceptually illustrates the workflow for the scheduler of FIG. 2 in some embodiments.

FIG. 7 conceptually illustrates the workflow for the scheduler 270 of FIG. 2 in some embodiments. As shown, each application 220-225 (only two applications are shown for simplicity) utilizes an API (as shown by arrows 705-710) to identify tasks that are available for execution to the application's corresponding local task manager 250-255. The local task managers 250-255 in turn use an API to add the tasks (as shown by arrows 715-720) to the applications' corresponding queues 235-240.

Each local task manager 250-255 utilizes the corresponding application's intra application scheduling policies (e.g., first come first served policy, round robin policy, priority based policy, etc.) to add each task to an appropriate location in the application's queue. As a result, the tasks on each queue are already sorted by placing the next task to execute at the top of the queue. Once there is a need to execute the next task from an application queue, the task from the top of the queue is released for execution. As shown, each application 220-225 has a separate queue 235-240 and the tasks are placed in the queues based on the intra application scheduling policies that are custom defined for each application.

Once the application manager 220 is notified that a thread has become available (as shown by the release( ) signal 740), the application manager 210 determines the application queue from which the next task to be executed. The application manager utilizes the inter application scheduling policy to identify the application queue from which the task to be executed.

Application manager 220 requests (as shown by getNextTask( ) signal 725) the location task manager 250 of the identified application queue (application queue 235 in the example of FIG. 7) to identify the next task for execution. This in turn results (in response to the getNextTask( ) signal) a task from the identified application queue to be released for execution based on the custom made intra application scheduling policy (as described above by reference to FIG. 3). Application manager 220 identifies this task to scheduler 270 using executeTask( ) signal 730.

If schedule controller does not find any tasks in the queues to be executed (i.e., no queue is present), the schedule controller goes to sleep mode (e.g., hibernates). A new task addition by an application invokes the schedule controller again to pick the next task to be executed. For instance, the schedule controller in some embodiments uses a "wait and notify" mechanism to keep a watch on tasks that are added to the queues. Once a task is added to a queue, the application manager is notified that a task is ready for execution.

Once all threads are utilized, the application manager waits for the thread pool 705 to signal (as shown by the arrow 735) the availability of a thread to the scheduler 270. The scheduler 270 signals (as shown by the release( ) signal 740) the application manager 220 to identify the next task to execute, which causes the application manager identify the next task to execute as described above.

Figure 8:
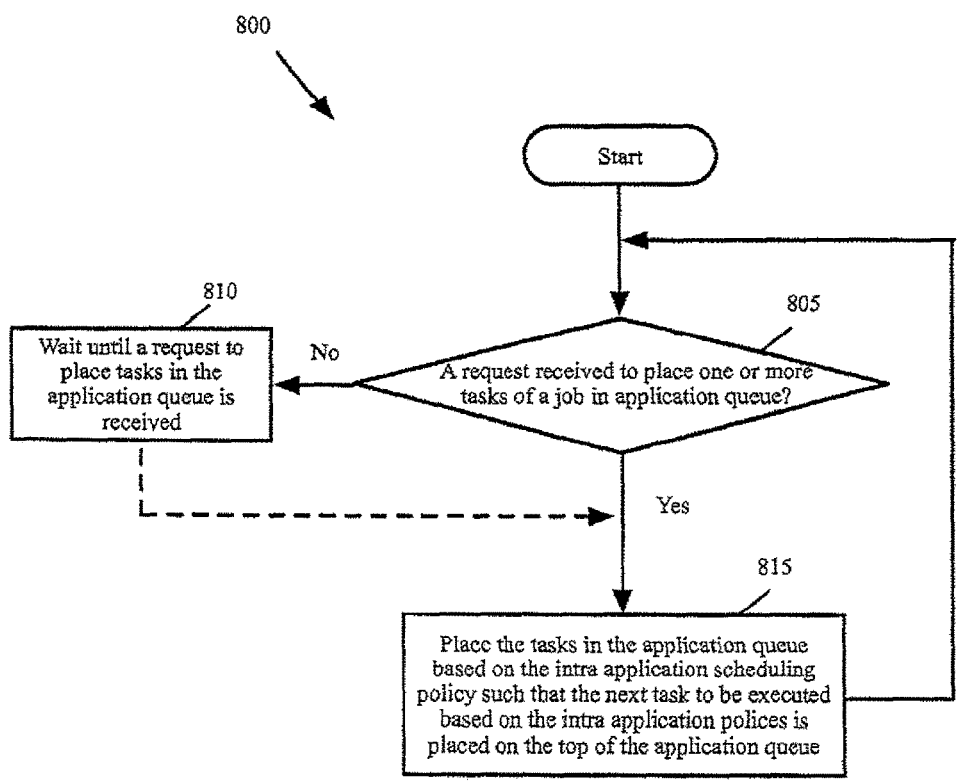
FIG. 8 conceptually illustrates a process for placing tasks in an application queue in some embodiments.

FIG. 8 conceptually illustrates a process 800 for placing tasks in an application queue in some embodiments. Process 800 is performed by a local task manager in some embodiments. As shown, the process determines (at 805) whether a request to place one or more tasks of a job in an application queue. If no request is received, the process waits (at 810) for a request to be received. For instance, the process hibernates until the corresponding application identifies (as shown by arrows 705 or 710 in FIG. 7) one or more tasks to be placed in the application queue.

When the process receives a request to add one or more tasks to the application queue, the process utilizes (at 815) the application's intra application scheduling policies to place the tasks in the application queue such that the next task to be executed is placed on the top of the application queue. The process then proceeds to 805, which was described above.

Figure 9:
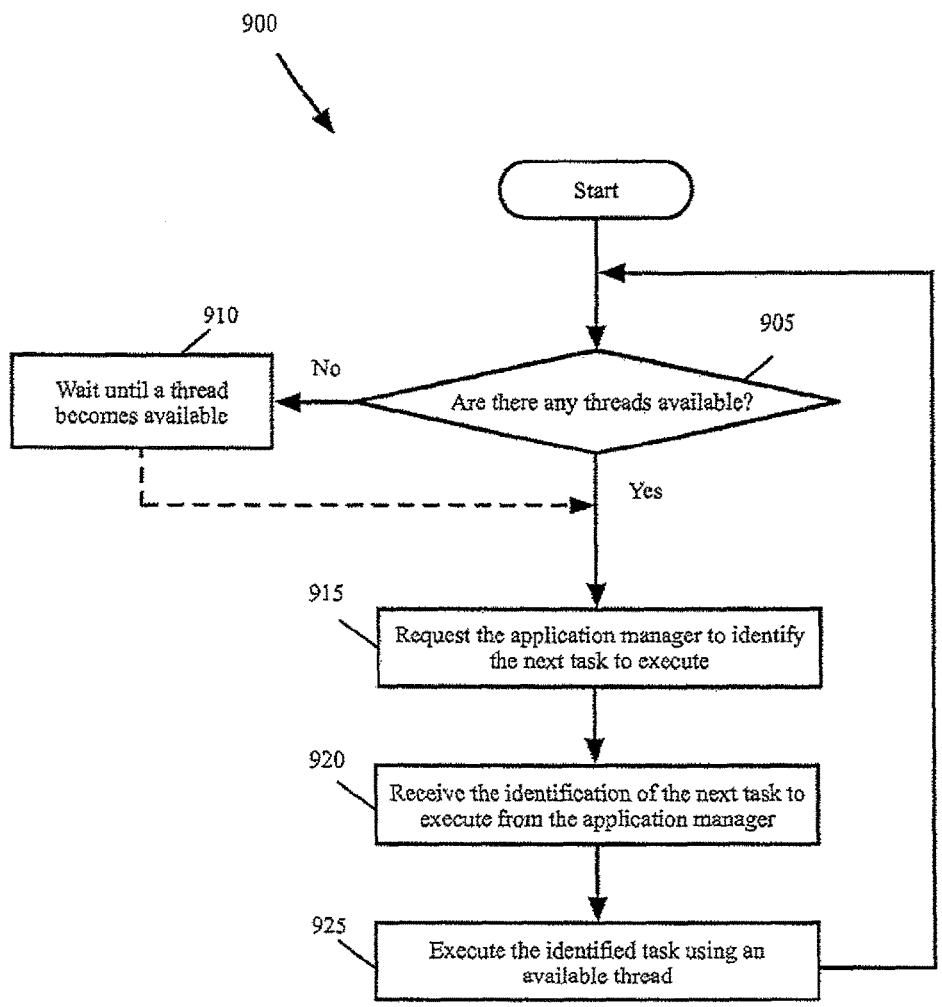
FIG. 9 conceptually illustrates a process in some embodiments for scheduling tasks by the scheduler shown in FIG. 2.

FIG. 9 conceptually illustrates a process 900 in some embodiments for scheduling tasks by the scheduler 270 shown in FIG. 2. As shown, the process determines (at 905) whether there are any threads available. If not, the process waits (at 910) until a thread becomes available. For instance, the process in some embodiments hibernates until the thread pool 705 notifies (as shown by the arrow 735 in FIG. 7) that a thread is available.

When a thread is available, the process sends a request (at 915) to the schedule controller to identify the next task to execute. For instance, the process sends the release( ) signal 740 (shown in FIG. 7) to the application manager to inform the application manager of availability of a thread to cause the application manager use inter application scheduling policies to determine an application queue to release the next task for execution. The process then receives (at 920) the identification of the task to be executed from the application manager (as shown by executeTask( ) signal in FIG. 7). The process then executes (at 925) the identified task using an available thread. The process then proceeds to 905, which was described above.

Figure 10:
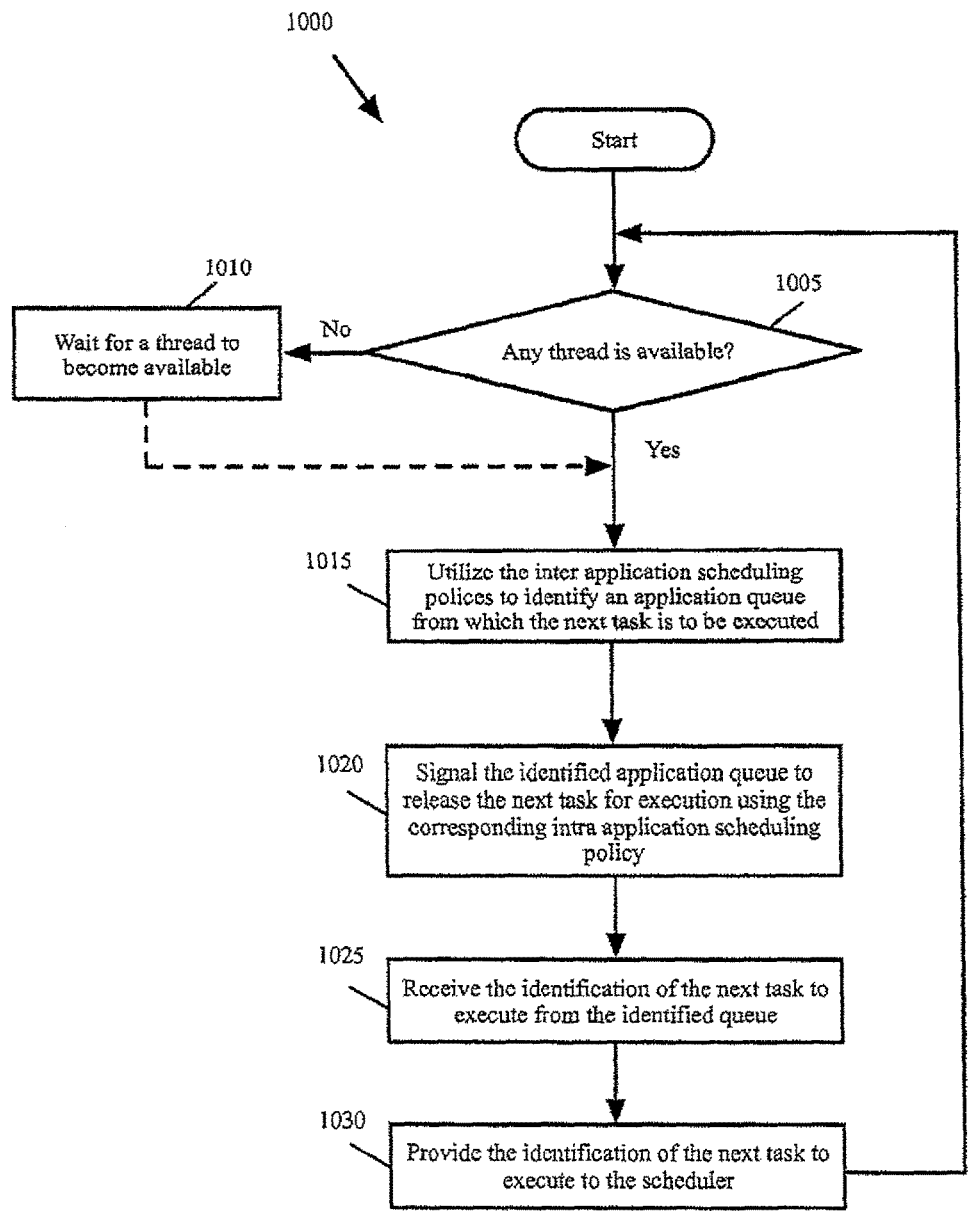
FIG. 10 conceptually illustrates a process for determining the next task to execute by the application manager of the schedule controller in some embodiments.

FIG. 10 conceptually illustrates a process 1000 for determining the next task to execute in some embodiments. Process 1000 is performed by the application manager of the schedule controller in some embodiments. As shown, the process determines (at 1005) whether a thread has become available (e.g., by receiving the release( ) signal 740 in FIG. 7). If no thread is available is received, the process waits (at 1010) for the next thread to become available. For instance, the process in some embodiments hibernates until the scheduler 270 sends a release( ) signal (as shown by the arrow 740 in FIG. 7) to inform that a thread has become available.

When the process determines that a thread is available, the process utilizes (at 1015) the inter application scheduling policies to identify an application queue from which the next task is to be executed. The process then signals (at 1020) the identified application queue to release the next task for execution using the corresponding intra application scheduling policy. For instance, the process sends a getNextTask( ) signal 725 (shown in FIG. 7) to the local task manager of the identified queue.

The process then receives (at 1025) the identification of a task from the identified application queue to be released for execution. The process then provides (at 1030) the identification of this task to the scheduler (e.g., by using executeTask( ) signal 730 shown in FIG. 7). The process then proceeds to 1005, which was described above.

Figure 11:
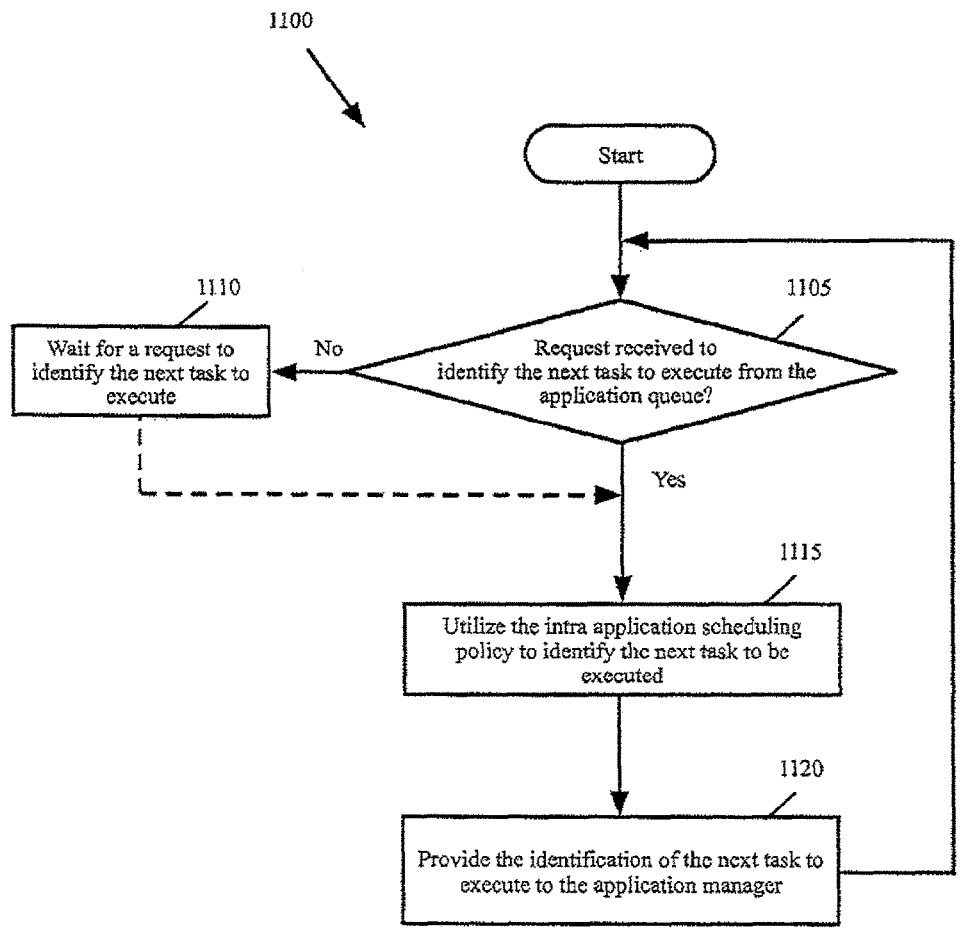
FIG. 11 conceptually illustrates a process for determining the next task in an application queue in some embodiments.

FIG. 11 conceptually illustrates a process 1100 for determining the next task in an application queue in some embodiments. Process 1100 is performed by a local task manager when the corresponding application queue is identified by process 1000 (e.g., by operation 1015 in FIG. 10) as the application queue to provide the next task to execute.

As shown, process 1100 determines (at 1105) whether a request is received to identify the next task to execute from the application queue. For instance, the process determines whether a getNextTask( ) signal 725 shown in FIG. 7 is received. If no request is received, the process waits (at 1110) until a request to identify the next task is received. For instance, the process hibernates until a request is received (as shown by the arrow 725 in FIG. 7) from the application manager 220 to identify the next task to release from the queue.

When the process receives a request to identify the next task from the application queue to execute, the process utilizes (at 1115) the intra application scheduling polices to identify the next task to be executed from the queue. The process then provides (at 1120) the identification of the next task to execute to the application manager. The process then proceeds to 1105, which was described above.

Although the schedule controller is described as a pluggable engine that is added to an existing scheduler, it should be understood that the schedule controller can operate as a standalone scheduler. For instance, by adding a component to the schedule controller 210 in FIG. 2 to provide the functionality of the scheduler 270 (e.g., as described above by reference to FIGS. 7 and 9).

The embodiments of the schedule controller described above can be utilized as a general purpose scheduler in different workflow environments. The following is an example of one such environment. Virtualization is the ability to simulate a hardware platform, such as a server, storage device or network resource, in software. A virtual machine (VM) is a software implementation of a machine such as a computer. Virtual networks are abstractions of a physical network. VMs may communicate using virtual networks.

A network manager in a virtualization environment is a software networking and security virtualization platform that delivers the operational model of a virtual machine for the network. The network Manager is the centralized management component of a virtual network. A network manager in some embodiments is implemented as a web application deployed on a server. The network manager includes a core set of features, which are used by various applications. Some of the core features are lifecycle management, persistence layer, and a task framework for scheduling jobs. The jobs can be scheduled in several different ways such as immediate, fixed delay and Cron expression based (which allows tasks to run periodically at fixed times, dates, or intervals).

The disclosed schedule controller can be readily integrated with such an enterprise web application. The pluggable architecture of the schedule controller allows the scheduling strategy to be specified across applications and also gives the consumers the flexibility to specify the scheduling strategy within their workloads.

The following is examples of the advantages that the disclosed schedule controller provides. The schedule controller is capable of handling workloads across applications. Each application can specify its own scheduling strategies such that the tasks from the same application can be controlled. Fair share strategy can be specified across the applications to find the application to get the next chance to execute the task. Custom schedule strategies for inter as well as intra application can override the existing or the default strategies. The pluggable engine can be integrated with any existing schedulers for a better performance and utilization.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
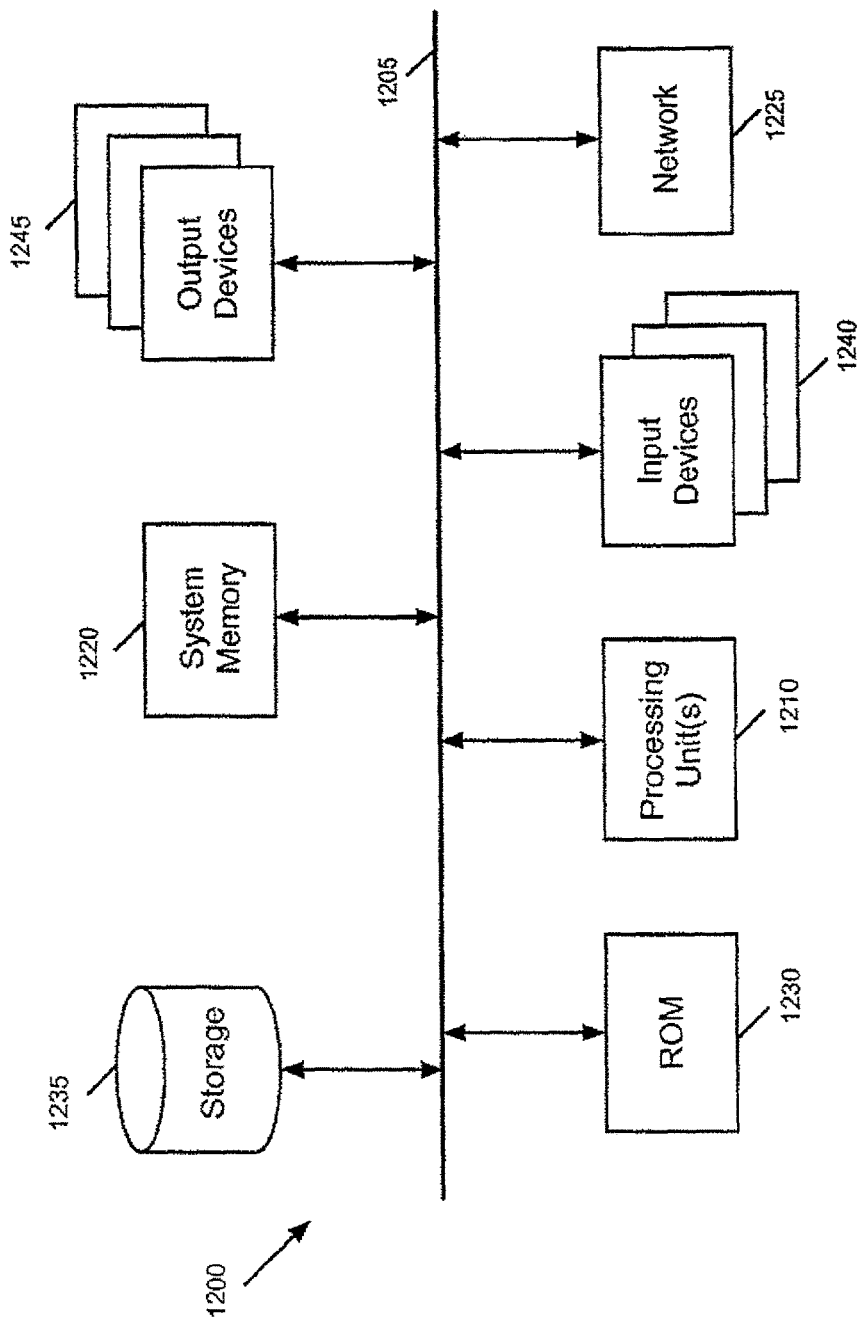
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1220, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1220, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1220 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6 and 8-11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of scheduling tasks for a plurality of applications, each application associated with a separate application task queue for identifying application tasks that are ready for execution, the method comprising:
    receiving a request from an application to place a task of the application in an application task queue;
    placing the task in the application task queue based on a set of intra application scheduling policies defined for the application;
    receiving a request to identify a next task to execute;
    identifying an application task queue from which the next task is to be executed, the application task queue identified based on a set of inter application scheduling policies defined across the plurality of applications; and
    scheduling a task from the identified application task queue for execution based on said intra application scheduling policies.

2. The method of claim 1, wherein placing the task in an application task queue comprises:
    identifying a sequence of execution for the application tasks based on said intra application scheduling policies; and
    placing the tasks in the application task queue based on the identified sequence of execution.

3. The method of claim 1, wherein the intra application scheduling policies are defined for each application, wherein the intra application scheduling policies comprise one of first come first served scheduling policy, round robin scheduling policy, priority-based scheduling policy, and weight-based scheduling policy.

4. The method of claim 1, wherein the inter application scheduling policies defined across the plurality of applications comprise one of first come first served scheduling policy, round robin scheduling policy, priority-based scheduling policy, and weight-based scheduling policy.

5. The method of claim 1, wherein a maximum number of threads are available for executing different tasks, wherein scheduling the task from the identified application task queue comprises:
    determining that one or more threads are available to execute tasks,
    wherein scheduling the task for execution comprises assigning the task to one of the available threads to execute.

6. The method of claim 1, wherein a maximum number of threads are available for executing different tasks, wherein scheduling the task from the identified application task queue comprises:
    determining that no threads are available to execute tasks;
    waiting for a next thread to become available;
    receiving a notification that a thread is available to execute a task; and
    wherein scheduling the task for execution comprises assigning the task to one of the available threads to execute.

7. The method of claim 1, wherein a maximum number of threads are available for executing different tasks, wherein scheduling the task from the identified application task queue comprises:
 determining that one or more threads are available to execute tasks;
 determining that no tasks are available for execution;
 waiting for a next task to become ready for execution;
 receiving a notification that one or more tasks are available for execution; and
 assigning the task to an available thread to execute.

8. A non-transitory machine readable medium storing a program for scheduling tasks for a plurality of applications, each application associated with a separate application task queue for identifying application tasks that are ready for execution, the program executable by a processing unit, the program comprising sets of instructions for:
 receiving a request from an application to place a task of the application in an application task queue;
 placing the task in the application task queue based on a set of intra application scheduling policies defined for the application;
 receiving a request to identify a next task to execute;
 identifying an application task queue from which the next task is to be executed, the application task queue identified based on a set of inter application scheduling policies defined for the plurality of applications; and
 scheduling a task from the identified application task queue for execution based on said intra application scheduling policies.

9. The non-transitory machine readable medium of claim 8, wherein the set of instructions for placing the task in an application task queue comprises sets of instructions for:
 identifying a sequence of execution for the application tasks based on said intra application scheduling policies; and
 placing the tasks in the application task queue based on the identified sequence of execution.

10. The non-transitory machine readable medium of claim 8, wherein the intra application scheduling policies are defined for each application, wherein the intra application scheduling policies comprise one of first come first served scheduling policy, round robin scheduling policy, priority-based scheduling policy, and weight-based scheduling policy.

11. The non-transitory machine readable medium of claim 8, wherein the inter application scheduling policies defined across the plurality of applications comprise one of first come first served scheduling policy, round robin scheduling policy, priority-based scheduling policy, and weight-based scheduling policy.

12. The non-transitory machine readable medium of claim 8, wherein a maximum number of threads are available for executing different tasks, wherein the set of instructions for scheduling the task from the identified application task queue comprises sets of instructions for determining that one or more threads are available to execute tasks, wherein the set of instructions for scheduling the task for execution comprises a set of instructions for assigning the task to one of the available threads to execute.

13. The non-transitory machine readable medium of claim 8, wherein a maximum number of threads are available for executing different tasks, wherein the set of instructions for scheduling the task from the identified application task queue comprises a set of instructions for:
 determining that no threads are available to execute tasks;
 waiting for a next thread to become available;
 receiving a notification that a thread is available to execute a task; and
 wherein the set of instructions for scheduling the task for execution comprises a set of instructions for assigning the task to the available thread to execute.

14. The non-transitory machine readable medium of claim 8, wherein a maximum number of threads are available for executing different tasks, wherein the set of instructions for scheduling the task from the identified application task queue comprises sets of instructions for:
 determining that one or more threads are available to execute tasks;
 determining that no tasks are available for execution;
 waiting for a next task to become ready for execution;
 receiving a notification that one or more tasks are available for execution; and
 assigning the task to an available thread to execute.

15. A system comprising:
 a set of processing units; and
 a non-transitory machine readable medium storing a program for scheduling tasks for a plurality of applications, each application associated with a separate application task queue for identifying application tasks that are ready for execution, the program executable by a processing unit in the set of processing units, the program comprising sets of instructions for:
 receiving a request from an application to place a task of the application in an application task queue;
 placing the task in the application task queue based on a set of intra application scheduling policies defined for the application;
 receiving a request to identify a next task to execute;
 identifying an application task queue from which the next task is to be executed, the application task queue identified based on a set of inter application scheduling policies defined for the plurality of applications; and
 scheduling a task from the identified application task queue for execution based on said intra application scheduling policies.

16. The system of claim 15, wherein the set of instructions for placing the task in an application task queue comprises sets of instructions for:
 identifying a sequence of execution for the application tasks based on said intra application scheduling policies; and
 placing the tasks in the application task queue based on the identified sequence of execution.

17. The system of claim 15, wherein the intra application scheduling policies are defined for each application, wherein the intra application scheduling policies comprise one of first come first served scheduling policy, round robin scheduling policy, priority-based scheduling policy, and weight-based scheduling policy.

18. The system of claim 15, wherein the inter application scheduling policies defined across the plurality of applications comprise one of first come first served scheduling policy, round robin scheduling policy, priority-based scheduling policy, and weight-based scheduling policy.

19. The system of claim 15, wherein a maximum number of threads are available for executing different tasks, wherein the set of instructions for scheduling the task from the identified application task queue comprises sets of instructions for determining that one or more threads are available to execute tasks, wherein the set of instructions for scheduling the task for execution comprises a set of instructions for assigning the task to one of the available threads to execute.

20. The system of claim 15, wherein a maximum number of threads are available for executing different tasks, wherein the set of instructions for scheduling the task from the identified application task queue comprises a set of instructions for:
   determining that no threads are available to execute tasks;
   waiting for a next thread to become available;
   receiving a notification that a thread is available to execute a task; and
   wherein the set of instructions for scheduling the task for execution comprises a set of instructions for assigning the task to the available thread to execute.

21. The system of claim 15, wherein a maximum number of threads are available for executing different tasks, wherein the set of instructions for scheduling the task from the identified application task queue comprises sets of instructions for:
   determining that one or more threads are available to execute tasks;
   determining that no tasks are available for execution;
   waiting for a next task to become ready for execution;
   receiving a notification that one or more tasks are available for execution; and
   assigning the task to an available thread to execute.

* * * * *